March 19, 1968     W. FISCHER ET AL     3,373,807

UNDERWATER PIPELINE CONNECTING METHOD AND APPARATUS

Filed June 6, 1966     3 Sheets-Sheet 1

INVENTORS
WILLIAM FISCHER
WILLIAM R. POSTLEWAITE
BY
ATTORNEYS

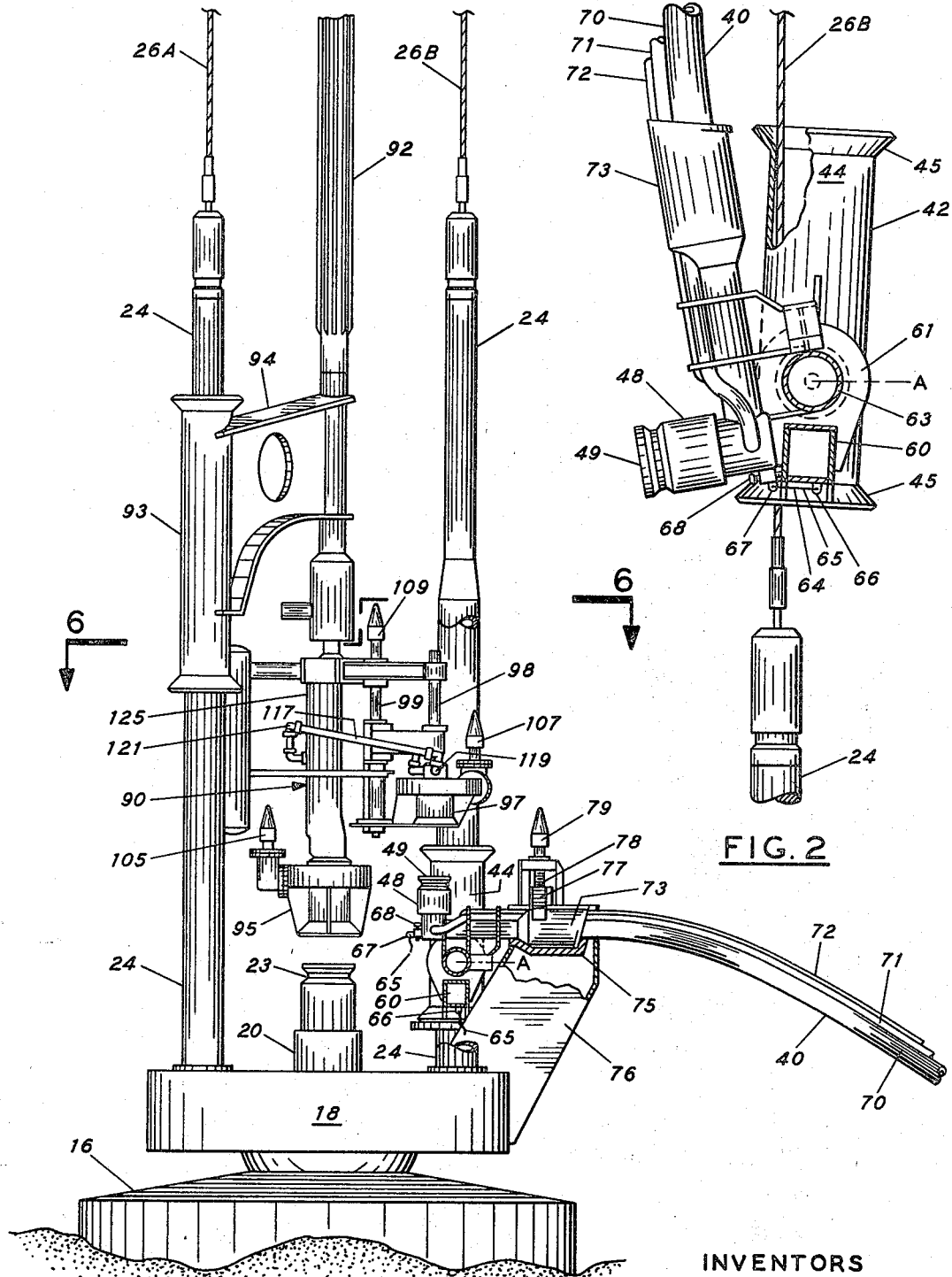

March 19, 1968 W. FISCHER ETAL 3,373,807
UNDERWATER PIPELINE CONNECTING METHOD AND APPARATUS
Filed June 6, 1966 3 Sheets-Sheet 3
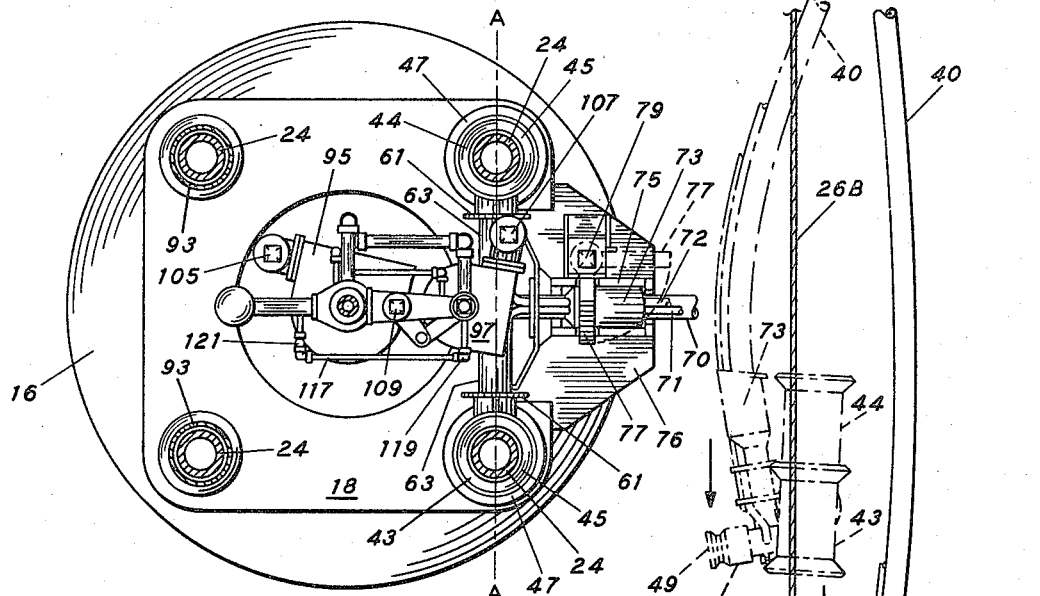
FIG. 6
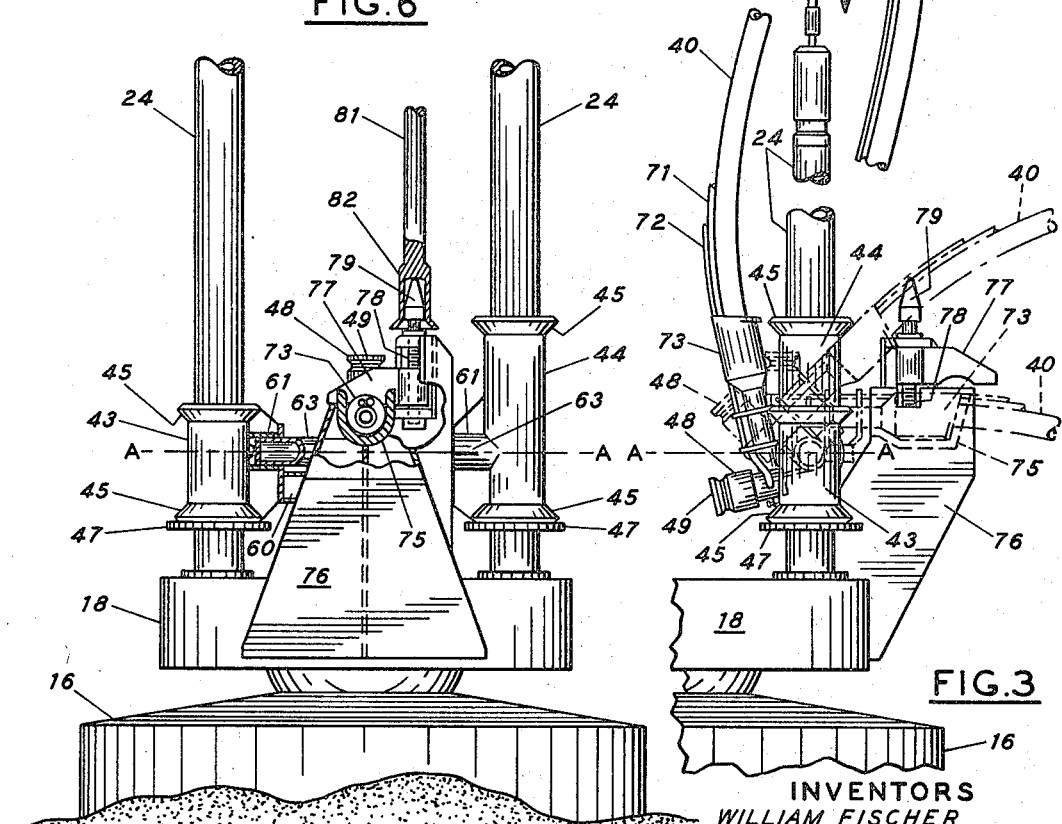
FIG. 4
FIG. 3
INVENTORS
WILLIAM FISCHER
WILLIAM R. POSTLEWAITE
BY
ATTORNEYS

3,373,807
UNDERWATER PIPELINE CONNECTING METHOD AND APPARATUS

William Fischer, Fullerton, and William R. Postlewaite, Menlo Park, Calif., assignors to Chevron Research Company, San Francisco, Calif., a corporation of Delaware
Filed June 6, 1966, Ser. No. 555,322
7 Claims. (Cl. 166—.5)

The present invention relates to completion of submerged wells. More particularly, it relates to a method of, and apparatus for, connecting an underwater pipeline to a submerged wellhead from a floating platform.

In the completion of submerged wells at offshore locations it is desirable to place the wellhead assembly far enough below the surface so that ships will not collide or otherwise damage the wellhead assembly that controls production of fluid from the well. Normally, such a wellhead is placed as near the ocean floor as possible, but in particularly deep waters, it may be located at some intermediate point, say 200 to 300 feet below the surface. At such depths, it is difficult, without the use of divers, to locate or connect a pipeline to the wellhead so that the well can be produced from a remotely located production platform or from a control location ashore.

Another prime problem in this type of deep water well completion is the laying of an underwater pipeline from the submerged wellhead to a central collection facility, usually but not necessarily, located on land. Proposals have been made heretofore to connect such an underwater, or submerged, pipeline by first laying the line between the wellhead and a storage tank. In such proposals, the well end of the pipeline is dropped to bottom in the vicinity of the well, either before or after the remainder of the line is laid to it. The pipeline is then laid from a barge, either continuously from a reel, or by welding sections of pipe together as the line is lowered to bottom. Then, through appropriate guide means, the pipeline terminus (wellhead end) is pulled horizontally (approximately) into a suitable connector affixed to the main base of the well. This fixed terminus connector is adapted, in turn, to receive a special connecting link on the "Christmas tree" (wellhead control assembly) as the tree is vertically lowered to engage the wellhead and the submarine pipeline proper. In some cases, a diver is used to connect the submarine pipeline terminus and the Christmas tree after they are independently installed.

Alternatively, it has been proposed to lower one end of the pipeline to a saddle fixed on the wellhead so that the end is horizontal at a known vertical elevation relative to guide means supported by a landing base surrounding the wellhead. With the end registered at this known elevation relative to the wellhead, a wellhead control assembly is then lowered. Through additional registration means at a similar known elevation on the control assembly the two horizontal couplers on the pipeline and control assembly can be interconnected, through a horizontally operable coupling means. Such a connection is exceedingly difficult because it requires alignment in both azimuth and elevation, and the angle therebetween must be correct so that all connections are substantially square and parallel to each other.

A particular object of the present invention is to provide a method of interconnecting an underwater pipeline to a submerged well by holding one end of the pipeline in essentially a vertical position as it is lowered along flexible guide means to land at a known position relative to the wellhead. As the opposite end of pipeline is then laid toward shore, from a floating platform, to a centralized production facility the lower end of the pipeline pivots in a vertical plane about this known position on a rotatable support so that the wellhead end of the pipeline rotates from vertical to horizontal.

In a preferred form, the rotatable support for the wellhead end of the pipeline includes an elbow member whose opening (or openings) is at substantially a right angle to the pipeline axis so that when the axis of the line rotates from vertical to its horizontal rest position, the axis of the opening in the elbow member is vertical and parallel to the axis of the wellhead. The pipeline is then flexibly connectable to the subsea wellhead by a wellhead control assembly, or Christmas tree, adapted to mutually engage wellhead connecting means and the pipeline elbow member. Both of these connections are made by a relatively simple vertical sliding connection between the two tree connectors and the respective, wellhead and pipeline elbow connectors.

In a preferred form of apparatus for practicing the method, the flexible guide means include a plurality of guide lines (tubing or cable) connected to a base member surrounding the wellhead. Each of these lines terminate at bottom in a guide post whose location is known and fixed relative to the wellhead. In a preferred procedure, at least one of the guide lines is held by a first floating platform, such as the one supporting a drilling, or workover, rig; another of the flexible guide lines is then connected to a second platform, such as the pipeline laying barge. In practice the guide lines of course are all connected to the drilling barge until the well is substantially completed and ready for production. At this point the pipeline laying barge is brought into position where one or more of the guide lines can be transferred to the lay barge. In a center-well drilling vessel, this may be done by keel-hauling the lines under the vessel's hull. Then, through the transferred guide lines, one end of the pipeline is rotatably connected to guide sleeves threaded over the transferred guide lines. The sleeves are adapted to engage closely the guide posts anchoring the transferred guide lines. As the pipeline is lowered vertically to bottom, guided by sleeves and guide lines, it is held by its own weight in a substantially vertical position until the sleeves engage the guide posts and land on a collar stop, or ring support member, set at a known vertical elevation on the guide posts. As additional sections of pipe are added to the line (or unreeled, if the line is preformed), the lay barge proceeds away from the wellhead toward the production storage facility, and the angle of the pipeline, relative to the axis of the wellhead, progressively increases until the wellhead end of the pipeline is substantially horizontal at the wellhead and resting on a bottom stop supported by the wellhead base. It is then clamped and locked in this position. This brings the axis of pipeline elbow opening parallel to the axis of the wellhead connector opening. This position is known and predetermined relative to the wellhead so that a Christmas tree may be readily lowered and connected to the pipeline elbow and the wellhead without the use of a diver or difficulty alignable horizontal connectors.

Further objects and advantages of the invention will become apparent from the following detailed description taken in conjunction with the accompanying drawings which form a part of the specification.

In the drawings:

FIGURE 2 is an enlarged vertical view, partly in section of the wellhead end of the pipeline being lowered vertically along the flexible guide lines, just prior to engagement with one of guide posts.

FIGURE 3 is an enlarged vertical view, partially in phantom, indicating the method of lowering an end of the pipeline from a lay barge and into engagement with guide posts on the landing base surrounding a wellhead; this view also shows in phantom successive positions of the pipeline end as the line is rotated from vertical to horizontal by laying of the line to storage.

FIGURE 4 is a front elevation view of the guide sleeve and pipeline connector arrangement shown in FIGURE 3, indicating an arrangement for securing the pipeline in its horizontal and locked position.

FIGURE 5 is a vertical elevation view of the complete wellhead assembly shown in FIGURE 1 with the pipeline anchored and just prior to setting of the wellhead control assembly to interconnect the wellhead and pipeline connector.

FIGURE 6 is a cross-sectional plan view, taken in the direction of arrows 6—6, on the wellhead assembly shown in FIGURE 5.

Figure 1:
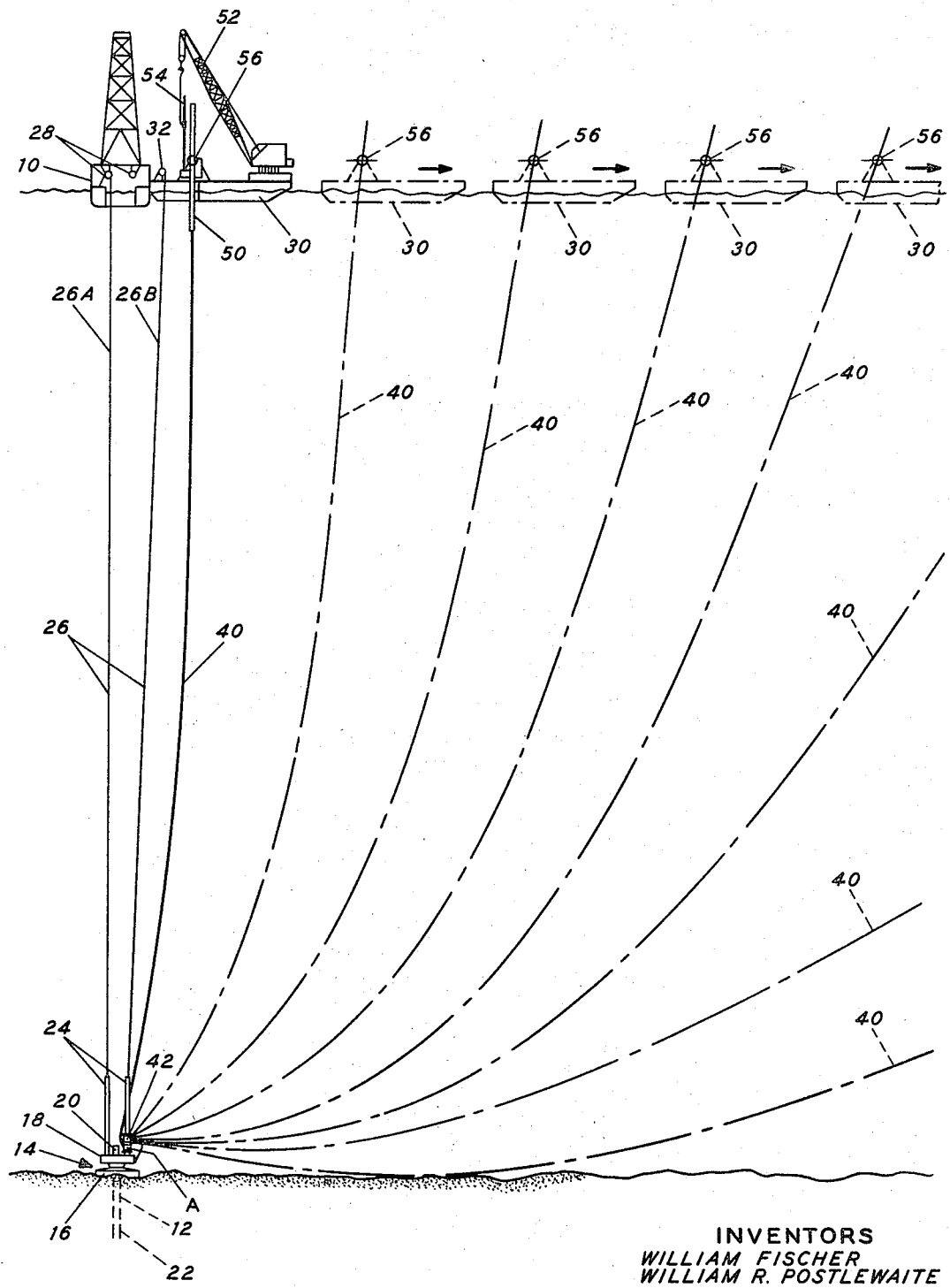
FIGURE 1 is a vertical view illustrating the method of laying pipeline from wellhead to storage in accordance with the present invention.

Referring now to the drawings and in particular FIGURE 1, there is indicated a preferred method of carrying out the present invention. As shown, drilling vessel 10 is located on the water surface above the subsea well 12 whose wellhead components are on the underwater bottom, and generally designated as 14. The subsea wellhead 14 includes a landing sub-base 16, a main base 18, guide posts 24, guide lines 26 (also designated 26A and 26B) and wellhead connector mandrel 20 which extends above the top of main base 18. Wellhead connector mandrel 20 ultimately provides continuity between the Christmas tree (wellhead control) and subsea well 12 proper. Main base 18 in this embodiment supports a plurality of guide posts 24 that anchor the lower ends of flexible guide lines 26. As is well understood in the art of drilling submerged wells, it is customary to use a set of guide lines such as 26 to interconnect vessel 10 to sub-base 16 when well 12 is spudded in. However, after main base 18 is run, guide lines may be disconnected from sub-base 16, or additional guide lines may be used to connect to guide posts 24 that are affixed to main base 18. Lines 26 are, of course, used to perform other operations in both drilling and completing well 12.

The foregoing arrangement is typical of subsea well equipment and the present invention is directed to a method of and apparatus for connecting a producing pipeline to such a well 12 after the well has been tested and the tests indicate that it is a potential producer. In the preferred method, as indicated in FIGURE 1, at least one, and preferably two, of the four lines 26 are transferred from drilling vessel 10 to lay barge 30. The upper ends of lines 26 are tensioned by weights, or other means, (not shown) through pulleys 28 and 32 to permit extension and reaction of lines 26 with approximately uniform tension when the ship heaves under wave or tide action. As indicated, two of the guide lines, such as those designated as 26B, are moved to a second platform, lay barge 30. The other two lines are left connected to barge 10. These are indicated as guide lines 26A. If vessel 10 includes a center-well, or opening, as shown, one convenient way to transfer lines 26B to barge 30 is to keel-haul them under barge 10 to barge 30. Either before or after such transfer, the well end of pipeline 40 is threaded over lines 26B by a guide sleeve arrangement 42. The construction of guide sleeve 42 and the pivot connection between the end of line 40 and sleeve 42 which serves to guide the end of pipeline 40 to subsea wellhead 14 will be described below with reference to FIGURES 2 and 3.

In FIGURE 1, the end of line 40 is shown in full line as it is landed by sleeve 42 on guide posts 24. The upper end of line 40 is shown as being assembled, or made up by welding, as the pipeline is being laid by barge 30 to a central storage tank, tank crude line or other production facility. The upper end is clamped in a welding fixture, designated generally as 50, so that lengths of pipe may be welded into line 40, as barge 30 moves away from drilling vessel 10. Several successive positions of line 40 are indicated in phantom in FIGURE 1, as lay barge 30 proceeds toward a central production facility.

A detailed description of a preferred method of assembling and laying the pipeline in this maner is disclosed in application Ser. No. 268,368, filed Mar. 27, 1963, by William R. Postlewait and Milton Ludwig, now patent No. 3,266,256, issued Aug. 16, 1966; this patent is assigned to the assignee of the present invention. As suggested schematically, crane 52 lifts sections of line pipe 54 from flat storage on barge 30 and inserts them into the upper end of welding fixture 50. The pipe 54 is welded to line 40 while the upper end of the line is clamped and held at a desired angle by mixture 50. Fixture 50 is supported by pivot point 56 so that the angle required for safe working conditions can be controlled in accordance with the relative position of the barge to wellhead 14 at the sea bottom. As prescribed in said Postlewaite and Ludwig application, this angle is carefully controlled to assure that the pipe forms a catenary curve of known characteristics that will prevent excessive, or sharp, flexing during the pipeline laying operation and takes account of the heave of barge 30 as it lays the pipeline.

FIGURES 2 to 6 illustrate a preferred form of apparatus for carrying out the method of the present invention. In particular, FIGURE 2 shows the lower end of pipeline 40 and its generally vertical position as it is lowered from lay barge 30 and guided along guide line 26B by sleeve 42 to contact post 24. In this embodiment, the main base 18 includes four equally spaced posts 24 surrounding subsea wellhead 14. Two of these posts 24 and their associated guide cables 26A are left connected to drilling barge 10. The other two guide lines 26B, connected to the remaining two posts are transferred to lay barge 30.

In the specific example shown in FIGURES 2 to 5, sleeve 42 suitably comprises a short tubular sleeve member 43 and a long tubular sleeve member 44 that respectively slide on a pair of posts 24. The ends of tubes 43 and 44 are flared, as at 45, to slide more easily over lines 26B and the top of posts 24. The lower flared ends 45 of tubes 43 and 44 seat on the upper surface of a support ring, or stop collar, 47 formed around the bottom of post 24. The elevation of the seat on ring, or stop collar 47 fixes a pivot axis A—A about which the end of pipeline 40 turns so that the opening 49 into elbow connector 48 on the end of line 40 at a known elevation relative to a wellhead connector, mandrel 23, at the top of coupler 20 on wellhead casing 22. Sleeves 43 and 44 are aligned with each other and relative to guide posts 24 by box beam 60. Box beam 60 also supports a pair of end bearing members 61 that rotatably mount shaft 63 forming the end support means for pipeline 40. The center of shaft 63 is the axis A—A about which elbow 48 at the end of pipeline 40 rotates. As further shown in FIGURE 2, pipeline 40 and elbow connector 48 are held in a nearly vertical position by breakable link 64 that includes wire 65 connected between lug 66 on beam 60 and lug 67 on elbow connector 48. Adjustment screw 68 controls the angle beyond the vertical that pipeline 40 can assume relative to sleeve 42. Wire 65 is of such a strength that it ruptures by subsequent laying of pipeline 40 to horizontal by rotation of connector 48 from the position shown in FIGURES 2 and 3 to that shown in FIGURES 4 and 5.

As seen in FIGURES 2, 3 and 5, pipeline 40 comprises three lines. Of course, this arrangement is only indicative of one form of such a line. It will be understood there may be more or less. These comprise flow annulus line 71 and control line 72. The three lines may either be laid separately to form a parallel bundle, or as in the present embodiment one or more lines may be within the other. In either event, line 40 terminates adjacent connector 48 in a header 73 that can be received and locked in saddle 75 supported in turn by bracket 76 mounted on the outboard side of well main base 18. This structure is particularly shown in FIGURES 3, 4 and 5 and illustrates one suitable way to clamp pipeline 40 in the desired positions with its axis generally horizontal.

In the present embodiment, the locking arrangement for holding header 73 in saddle 75 is clamp member 77 rotatably mounted on lead screw 78 (seen on the right hand side of saddle 75 in FIGURE 4). As pipeline 40 is lowered to bottom on sleeves 43 and 44, clamp 77 is held parallel to the pipeline. After header 73 seats in saddle 75, clamp 77 is turned to a position at right angles to the pipeline as shown in FIGURE 4 by turning head 79 on screw 78. As partially indicated in FIGURE 4, this operation is performed from drilling barge 10 by lowering drill string 81 with a drive socket 82 on its end over mating screw head 79. This method is specifically described in application Ser. No. 235,433, filed Nov. 5, 1962, by William R. Postlewaite, now Patent No. 3,225,826, issued Dec. 28, 1965, which is assigned to the assignee of the present invention. Briefly, drill string 81 is guided by a jig (not shown) to contact head 79, whose position is known relative to one or more of the guide posts 24. Rotation of drill string 81 then rotates lead screw 78 and forces clamp 77 down onto the top of header 73.

With the end of pipeline 40 then locked in a substantially horizontal position and connector head 48 rotated so that the axis of its opening 49 is vertical, it is now possible to interconnect the pipeline and the wellhead. Christmas tree, or wellhead control apparatus 90, is lowered from barge 10 on lines 26A. The exact position of wellhead control assembly 90 relative to the wellhead is controlled by drill string 92 and by a pair of guide collars, or sleeves 93 connected to each other and drill string 92 by web member 94. The center line of the wellhead 20 is, of course, known with respect to guide posts 24. Wellhead control assembly 90 in the embodiment shown in FIGURE 5 includes a remotely controlled coupling member 95 adapted to align axially with casing head mandrel 23 opening directly into the wellhead. A corresponding connector indicated as 97 is at the same time axially aligned in parallel with the axis of opening 49 in pipeline elbow 48. However, connector 97 is mounted on a vertical guide shaft 98 and lead screw 99 so that as wellhead assembly 90 is lowered and well connector 95 engaged mandrel 23, that joint alone is made up prior to engagement of connector 97 with pipeline elbow 48.

A method of making up and sealing these connections is particularly shown and described in application Ser. No. 235,432, filed Nov. 5, 1962, by Edward T. Chan and William R. Postlewaite, now Patent No. 3,308,881, issued Mar. 14, 1967, assignors to the assignee of the present invention. In general according to that method, connectors 95 and 97 close around their respective mating elements 23 and 48 by rotation of the drill string as a long-handled socket wrench similar in manner to that shown in FIGURE 4 on the end of drill string 81. The operating socket connections for connectors 95 and 97 are respectively identified as 105 and 107. Rotation of lead screw 99 lowers connector 97 into engagement with pipeline connector 48. This drive is also through a drill string and socket wrench connector 109. Flexible piping 117 includes rotatable joints 119 and 121 that interconnect the three lines of pipeline 40, to the interior of the Christmas tree, or valve controlling portion 125, of well control assembly 90.

While only a single embodiment of the apparatus has been shown for carrying out the method of the present invention, certain modifications of the apparatus to perform the method of our invention will be apparent to those skilled in the art. For example, the wellhead end of the pipeline may terminate in a 90° turn of sufficiently large radius to permit wash-down tools to be pumped through the line and into the well through the turn rather than through elbow connector 48. Additionally the connection between Christmas tree and pipeline may be independent of the connection to the wellhead. However, in all such arrangements the pipeline is progressively laid down into a horizontal position from its initial vertical attitude so that as it is lowered to bottom the wellhead terminus rotates into a position so that its opening is parallel to the wellhead opening. Final sealing of the Christmas tree to the wellhead and pipeline is optional; either the tree is connected first to the pipeline and then the wellhead, or in the reverse order.

Additionally, it will be apparent that pipeline 40 may be made up (by welding or threading) in a length equal to the distance from wellhead to drilling barge 30 and then lowered along guide lines 26 before lines 26B are transferred to lay barge 30. In this case, then both support of the upper end of pipeline 40 and guide lines 26B are transferred to lay barge 30 before the rest of the line is laid to rotate the axis of line 40 in the vertical plane.

Other modifications and changes in both the method and apparatus will occur to those skilled in the art. All such changes coming within the scope of the appended claims are intended to be included.

We claim:

1. The method of connecting an underwater pipeline to a submerged wellhead from a floating platform above said wellhead, said wellhead having an opening therein communicating with a well bore penetrating earth strata below a body of water, which comprises
    (a) connecting flexible guide means from a location adjacent said wellhead to said floating platform,
    (b) lowering one end of a pipeline vertically downwardly from said floating platform along said flexible guide means so that the longitudinal axis of said pipeline adjacent said one end thereof is in a vertically disposed position when said one end lends adjacent said wellhead,
    (c) retaining support of the other end of said pipeline on said platform during said lowering operation, said one end of pipeline terminating at substantially a right angle with respect to said longitudinal axis,
    (d) progressively moving said platform on the water surface and continuing the lowering of said pipeline from said platform until said axis of said pipeline is rotated from said vertically disposed position to a generally horizontally disposed position,
    (e) securing said pipeline in said horizontally disposed position to place the opening in said pipeline at a known displaced location relative to and substantially parallel with said opening in said wellhead,
    (f) then lowering and guiding along flexible guide means a wellhead control assembly adapted to be indexed by said flexible guide means to register with the opening in said wellhead and said one end of said pipeline, and
    (g) securing said wellhead control assembly to said wellhead and said one end of said pipeline to permit control of fluid flow between said pipeline and said well bore.

2. The method in accordance with claim 1 wherein the securing of said one end of said pipeline adjacent said wellhead includes locking said one end to prevent rotational movement in a vertical plane of said pipeline to thereby maintain said one end and at said known displaced location relative to said opening in said wellhead.

3. The method in accordance with claim 1 which includes terminating said one end of said pipeline in an elbow member, and rotatably engaging said elbow member with the slidable connection to said flexible guide means so that upon rotation of said axis of said pipeline adjacent said one end from vertical to horizontal by the laying down thereof the opening to said elbow member is rotated into said substantially parallel relationship with respect to the axis of the wellhead thereby to permit respective receipt of a pair of downwardly opening connections on said wellhead control assembly by said wellhead opening and said opening of said pipeline elbow member.

4. The method of connecting a submarine pipeline to a subsea wellhead from a floating platform positioned at the seat surface and above said subsea wellhead wherein a plurality of flexible guide means extend to the sea surface from a subsea base surrounding said wellhead and are positioned in fixed relationship to said subsea wellhead, the improvement that comprises
   (a) connecting at least one of said flexible guide means to a first vessel adapted to be positioned over said wellhead and at least one other of said flexible guide means to a second floating vessel adapted to be positioned over said wellhead, one of said floating vessels being adapted to transport and lay a submarine pipeline,
   (b) positioning said one vessel to receive said flexible guide means,
   (c) slidably connecting one end of said pipeline to said flexible guide means at the sea surface,
   (d) guiding said one end downwardly into engagement with a registration position on said subsea base, said registration position being at a known orientation to the opening in said wellhead,
   (e) then progressively moving said one vessel toward the terminal for said pipeline and
   (f) simultaneously laying out said pipeline while so moving to rotate said one end of said pipeline into a position where the axis of said pipeline is substantially 90° to the opening in said wellhead,
   (g) then lowering from the other of said vessels along said guide means connected thereto a wellhead control means having valve operable openings therein for controlling the flow of well fluids between said pipeline and said wellhead, and
   (h) securing said wellhead control assembly to said wellhead and to said end of said pipeline to interconnect said wellhead and said pipeline through said wellhead control assembly.

5. A method in accordance with claim 4 wherein at least said first vessel includes a center well and both of said flexible guide means are attached to said first vessel, the additional steps of transferring said at least one other flexible guide means to said second vessel by keelhauling said guide means from under said first vessel to said second vessel prior to the laying of a sufficient length of said pipeline toward said terminal to rotate said axis of said pipeline from vertical to horizontal.

6. A method in accordance with claim 4 wherein said one end of said pipeline is slidably connected to said other flexible guide means and said one end of said pipeline is lowered to said registration position prior to transfer of said at least one flexible guide means from said first vessel to said second vessel.

7. Apparatus for connecting an underwater pipeline to a submerged wellhead from a floating platform without the use of a diver, wherein the connection between platform and wellhead includes a plurality of flexible guide lines, each of said guide lines being connected to a guide post mounted on a base member, said base member surrounding said submerged wellhead, the location of said guide posts being known and fixed relative to the axis of said wellhead, and the upper ends of said flexible guide cable supported under tension at said platform, the improvement that is characterized by
   (a) sleeve means adapted to engage and guide along a pair of said guide lines, said sleeve means having an inside diameter to engage said guide posts,
   (b) collar stop means on said guide posts to seat said sleeve means at a fixed elevation on said guide posts,
   (c) bearing means supported by said sleeve means for rotatably mounting a pipeline terminus,
   (d) said terminus including a right-angle coupling for receiving one end of a pipeline,
   (e) saddle means mounted on said base member to limit the rotation of said pipeline terminus to position the axis of said pipeline at said base member substantially horizontally and the axis of the opening to said pipeline coupling substantially vertically, and
   (f) means for locking said pipeline terminus in said saddle means to permit coupling of a wellhead control assembly to both said wellhead and said terminus by vertically-oriented coupling means mutually engageable by said wellhead and said pipeline terminus with said wellhead control assembly.

References Cited
UNITED STATES PATENTS

| | | | |
|---|---|---|---|
| 3,052,299 | 9/1962 | Geer et al. | 166—.6 |
| 3,214,921 | 11/1965 | Goepfert et al. | 61—72.3 |
| 3,219,119 | 11/1965 | Matthews | 166—.5 |
| 3,220,477 | 11/1965 | Jones | 166—.5 |
| 3,233,666 | 2/1966 | Geer et al. | 166—.5 |
| 3,233,667 | 2/1966 | Van Winkle | 166—.6 |
| 3,308,881 | 3/1967 | Chan et al. | 166—.6 |
| 3,336,975 | 8/1967 | Word et al. | 166—.5 |

CHARLES E. O'CONNELL, *Primary Examiner.*

RICHARD E. FAVREAU, *Assistant Examiner.*

UNITED STATES PATENT OFFICE
CERTIFICATE OF CORRECTION

Patent No. 3,373,807                          March 19, 1968

William Fishcer et al.

It is certified that error appears in the above identified patent and that said Letters Patent are hereby corrected as shown below:

Column 2, line 63, after "vertical" insert -- elevation --; column 3, line 50, for "reaction" read -- retraction --; column 4, line 3, for "maner" read -- manner --; line 5, for "Postlewait" read -- Postlewaite --; line 12, for "mixture" read -- fixture --; column 6, line 34, for "lends" read -- lands --; line 61, after "end" strike out "and"; column 7, line 3, for "seat" read -- sea --.

Signed and sealed this 29th day of July 1969.

(SEAL)
Attest:

Edward M. Fletcher, Jr.                        WILLIAM E. SCHUYLER, JR.
Attesting Officer                                    Commissioner of Patents